Feb. 10, 1959    M. D. CANNING    2,873,011
CONVEYOR
Filed Aug. 22, 1956
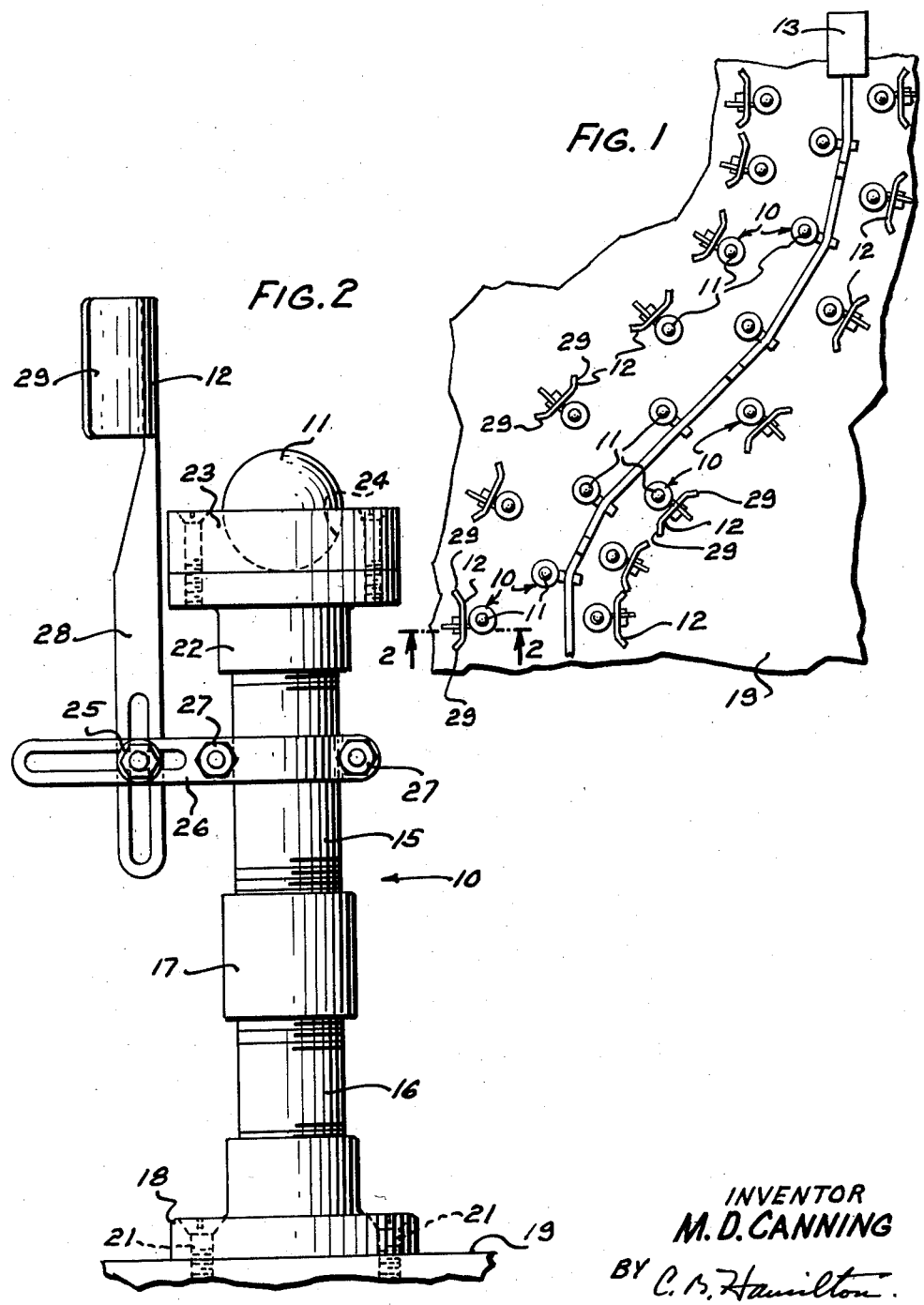
INVENTOR
M. D. CANNING
BY C. B. Hamilton
ATTORNEY

United States Patent Office 2,873,011
Patented Feb. 10, 1959

2,873,011

CONVEYOR

Maurice D. Canning, Wheaton, Ill., assignor to Western Electric Company, Incorporated, New York, N. Y., a corporation of New York Application August 22, 1956, Serial No. 605,621

2 Claims. (Cl. 193—35)

This invention relates to conveyor units, and more particularly to conveyor units that may be selectively positioned to provide conveyor paths of many diverse configurations.

In installations requiring gravity facilities for rapidly conveying articles from one location to another, it is often a prime requisite that these facilities be adapted to rapid alteration in both the paths described and the pitch of the conveyor units. Frequently, there is an additional requirement that the individual conveyor units be adapted for ready replacement in case of failure. Further, it is desirable that the conveyor may be disassembled with a minimum amount of effort, and that the individual units may be stored within a relatively small space.

It is a primary object of this invention to provide simple and economic conveyor units that may be utilized to readily form a plurality of various shaped conveyor paths.

Another object of the invention resides in a conveyor unit that may be rapidly and easily installed or removed from a conveyor path.

It is a further object of the invention to provide a conveyor unit that may be adjusted to vary the pitch of a gravity-type conveyor path.

A further and more finite object of the invention is to provide a conveyor unit of the pedestal type having a rotatably mounted spheroid as the movable conveyor element.

It is still a further object of the invention to provide a pedestal type conveyor unit that may have a guide member secured thereto for controlling the lateral movement of articles being conveyed.

With these and other objects in view, the present invention contemplates a conveyor path made up of a plurality of pedestal-type conveyor units. Each unit comprises a pedestal structure that may be detachably secured to a floor to describe the conveyor path. The pedestal is fabricated in two sections that are joined by a threaded coupling to provide facilities for adjusting the height of each conveyor unit, and consequently, the pitch of the conveyor path. Conveyor action is attained by a spheroid rotatably mounted in a bearing at the top of each pedestal.

Pedestals are arranged in staggered fashion along the conveyor path and are spaced apart a distance slightly less than the minimum dimension of the engaged area of any article to be conveyed. Those conveyor units arranged along the lateral sides of the path are provided with adjustable guide members to insure that the conveyed articles are retained in the path.

Other objects and advantages of the present invention will be apparent from the following detailed description when considered in conjunction with the accompanying drawings wherein:

Fig. 1 is a plan view of a number of conveyor units arranged to provide a conveyor in accordance with the principal features of the present invention; and, Fig. 2 is a side elevational view of one of the typical conveyor units illustrated in Fig. 1.

Referring to Fig. 1 there is shown a plurality of conveyor units 10 arranged to provide a conveyor path. Each unit is in the form of a pedestal and has a ball bearing or spheroid 11 mounted in its upper extremity. Those conveyor units positioned along the sides of the conveyor path are provided with guide plates 12 to limit lateral movement of the articles along the conveyor path. Each pedestal 10 is spaced from the adjacent pedestal by an amount that is less than the minimum dimension of the engaged area of any article that is to be conveyed.

It may be appreciated that such a conveyor is adapted to handle a wide width of sheet material that is to be fed into a fabricating machine. In such an employment of the conveyor, the pedestals 10 would be spaced apart a distance sufficient to permit an operator to walk between the conveyor units to feed the material into the fabricating machine.

It is also within the contemplation of the invention to provide a chain or cable feed mechanism 13 to engage and advance the articles along the conveyor path. Due to the wide spacing of the pedestals 10, the chain drive mechanism may be readily fitted therein without possible interference with the conveyor units.

Referring to Fig. 2, there is shown a typical conveyor unit 10 provided with a guide plate 12 for use in forming the conveyor path shown in Fig. 1. It will be noticed that unit 10 is made up of two cylindrical sections 15 and 16 joined together by a threaded coupling 17. These sections 15 and 16 may be solid or hollow cylindrical members of ordinary pipe. Threadably attached to the lower terminus of the section 16 is a flanged securing member 18. This member is attached to a floor or other base through the agency of a number of securing screws 21. Threadably secured to the upper section 15 is another flanged member 22 having bolted thereto a bearing member 23. Formed in the bearing member 23 is a hemispherical recess 24 adapted to accommodate therein the ball bearing or spheroid 11. The spheroid 11 is fitted within the recess 24 in such a manner as to permit free rotation thereof.

The conveyor unit just described is utilized in the center row of conveyor unit shown in Fig. 1. When the conveyor is to be utilized as a gravity feed device, the coupling 17 may be adjusted to provide a descending pitch to each succeeding transverse group of conveyor units.

The conveyor units positioned along the lateral sides of the conveyor path are provided with a bracket 26 which spans the section 15 and is secured thereto through instrumentality of bolts 27. A bolt 25 secures the bracket 26 to a second bracket 28 having mounted thereon the guide plate 12. Each guide plate has curved edges 29 (see Fig. 1) to force the articles to move along the conveyor path.

Each of the brackets 26 and 28 is provided with an elongated slot through which the bolt 25 passes. It is thus possible to release the bolt 25 and thereby adjust the lateral positionment of the guide 12 or the height of the guide with respect to the associated spheroid 11.

It is to be understood that the above-described arrangements of apparatus and construction of elemental parts are simply illustrative of an application of the principles of the invention and many other modifications may be made without departing from the invention.

What is claimed:

1. A conveyor unit comprising a two section pedestal, a threaded coupling engaging the two sections of the pedestal for adjusting the length of said pedestal, a rotatably mounted spheroid positioned within a recess in the upper terminus of the pedestal, a flange secured to the lower terminus of the pedestal for securing said pedestal to a fixed support, a slotted bracket detachably and rotatably mounted to one pedestal section and laterally extending therefrom, a second bracket having an elongated slot therein, selectively fastenable means passing through both slots for securing said brackets together, and a guide member secured to said second bracket and positioned above said spheroid.

2. A conveyor unit comprising a two-section pedestal, an adjustable coupling for securing the two-section pedestal together to permit vertical adjustment, the upper surface of the upper section being provided with a recess, a spheroid rotatably positioned within said recess, a horizontal bracket having an elongated slot formed therein, means for detachably and rotatably mounting said horizontal bracket on one section of said pedestal, a vertical bracket having an elongated slot formed therein, means extending through said slots at the intersection of the brackets for adjustably securing said brackets together to permit vertical and horizontal adjustment, and a guide plate having curved end portions mounted on said vertical bracket.

References Cited in the file of this patent
UNITED STATES PATENTS

| | | |
|---|---|---|
| 790,776 | Alvey | May 23, 1905 |
| 1,778,267 | McArthur | Oct. 24, 1930 |
| 2,007,592 | Beeson | July 9, 1935 |
| 2,529,684 | Gass | Nov. 14, 1950 |

OTHER REFERENCES

Mathews Ball Transfer . . . Advertising Copy 20 M–6–31, received in U. S. Patent Office March 24, 1932.

Mathews Conveyor Co. Catalog, received U. S. Patent Office September 1, 1936 (pages B8–1–34 relied on).